US008749802B2

(12) United States Patent
Hopper et al.

(10) Patent No.: US 8,749,802 B2
(45) Date of Patent: Jun. 10, 2014

(54) METHOD AND SYSTEM FOR ON-THE-FLY DIAGNOSTIC PRINT METHODOLOGY

(75) Inventors: Samuel N. Hopper, Longmont, CO (US); Brian C. Pendleton, Longmont, CO (US); Kenneth S. Shouldice, Boulder, CO (US)

(73) Assignee: Infoprint Solutions Company, LLC, Boulder, CO (US)

( * ) Notice: Subject to any disclaimer, the term of this patent is extended or adjusted under 35 U.S.C. 154(b) by 2512 days.

(21) Appl. No.: 11/464,408

(22) Filed: Aug. 14, 2006

(65) Prior Publication Data

US 2008/0037048 A1      Feb. 14, 2008

(51) Int. Cl.
| | |
|---|---|
| G06F 3/12 | (2006.01) |
| G06K 15/00 | (2006.01) |
| G06K 15/02 | (2006.01) |
| H04N 1/60 | (2006.01) |
| H04N 1/46 | (2006.01) |

(52) U.S. Cl.
USPC ........... 358/1.13; 358/1.14; 358/1.2; 358/1.9; 358/504

(58) Field of Classification Search
USPC ............... 358/1.13, 296, 401, 444, 468, 1.15, 358/1.14, 407, 1.16, 1.2, 1.9, 504, 449, 358/1.12; 355/313; 314/395, 15; 347/1, 5, 347/7, 9, 43, 16, 29, 20, 23, 24, 86, 26, 49, 347/32, 30, 44, 17, 57, 75, 78, 87, 116, 171, 347/172, 182, 186, 198, 205, 214, 110; 399/10, 11, 9, 84, 87, 81, 82, 45, 407, 399/72, 410, 408, 405, 77
See application file for complete search history.

(56) References Cited

U.S. PATENT DOCUMENTS

| | | | | |
|---|---|---|---|---|
| 5,075,875 A | * | 12/1991 | Love et al. | 358/1.18 |
| 5,535,009 A | * | 7/1996 | Hansen | 358/296 |
| 6,175,700 B1 | * | 1/2001 | Miller et al. | 399/72 |
| 6,570,605 B1 | * | 5/2003 | Kashiwazaki | 347/264 |
| 6,906,813 B1 | * | 6/2005 | Tuchitoi et al. | 358/1.14 |
| 7,075,667 B1 | * | 7/2006 | Bonikowski et al. | 358/1.14 |
| 2004/0141006 A1 | * | 7/2004 | Livingston | 345/771 |

* cited by examiner

*Primary Examiner* — Ngon Nguyen
(74) *Attorney, Agent, or Firm* — Yudell Isidore Ng Russell PLLC

(57) ABSTRACT

A system, method and computer program product are disclosed. The method includes, during printing of a print data stream by a print engine, determining whether a graphical user interface has received an instruction representing an operator interrupt and, responsive to determining that the graphical user interface has received the instruction representing the operator interrupt, determining whether a command for a test print operation has been received from the graphical user interface. The method further includes, responsive to determining that the command for the test print operation has been received from the graphical user interface, performing a print of operator test samples and, responsive to determining that the command for the test print operation has been received from the graphical user interface, invoking a non-process runout function to suspend printing of the print data stream by the print engine.

12 Claims, 2 Drawing Sheets

METHOD AND SYSTEM FOR ON-THE-FLY DIAGNOSTIC PRINT METHODOLOGY

BACKGROUND OF THE INVENTION

1. Technical Field

The present invention relates in general to data processing systems and in particular to software installation. Still more particularly, the present invention relates to a system, method and computer program product for performing pre-installation conflict identification and prevention for an application for an installation on a data processing system.

2. Description of the Related Art

Printers are very common. Many people have small printers connected to their computers, or have larger office printers on a network that can be used by many people. Typically, these printers use "cut-sheet" paper, which is paper that has been previously cut into individual sheets (e.g., 8.5 inch×11 inch letter-size paper). Beside these cut sheet printers, there are very large and fast printers responsible that print on continuous form paper. This continuous form paper is supplied in large rolls. These printers may print millions of financial statements or utility bills per month.

In certain circumstances, printer operators or service personnel need to print "test samples" to verify the proper operation of a printer. It is preferable to print test samples rather than print routine print jobs from the host computer, because print samples can be designed to show print quality problems that occur only rarely in the normal flow of print jobs. Print samples can also perform other functions (such as ink jet cleaning).

It is not uncommon for printers to have built-in test sample functions and patterns. For example, low-cost ink jet printers may have special ink jet cleaning test patterns or alignment test patterns that may be activated from the operator panel either with a push button or by pressing buttons when power is applied to the printer. Many of these are capable of being activated via a graphical user interface, which interacts with the host system, as it is also common for special print drivers to be shipped with printers that allow these special print samples to be sent from a host computer.

In the prior art, it is typically uncommon for printers to be able to print these test samples while in the middle of a print job. The prior art does not provide adequate solutions to enable the sending to the printer of a one-hundred-page print job, followed by, before the print job has finished printing, commencement of printing of a set of print samples, which would be followed by finishing the one-hundred-page print job.

For larger printers, many of which print on continuous roll paper, operators or service personnel should check the print quality every few hours of continuous running. These samples may show scratches or other print quality defects that have developed during the day's printing and escaped notice. Under the prior art, the operator of these larger printers is not easily able to use the operator interface to stop the printer, immediately run the print quality sample checks, then start the printer again.

The prior art provides no acceptable solution for the mid-job printing of print samples by the operator or by service personnel. Typically, the printer is running very large print jobs, which may run for several hours or even days. The ability to allow an operator or service person to stop a printer, print a test sample, and then restart the printer without any disruption in the print job is highly desired.

SUMMARY OF THE INVENTION

A system, method and computer program product are disclosed. The method includes, during printing of a print data stream by a print engine, determining whether a graphical user interface has received an instruction representing an operator interrupt and, responsive to determining that the graphical user interface has received the instruction representing the operator interrupt, determining whether a command for a test print operation has been received from the graphical user interface. The method further includes, responsive to determining that the command for the test print operation has been received from the graphical user interface, performing a print of operator test samples and, responsive to determining that the command for the test print operation has been received from the graphical user interface, invoking a non-process runout function to suspend printing of the print data stream by the print engine.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

The present invention provides a method, system, and computer program product for performing on-the-fly diagnostic printing. Advantages of the current method include the ability to immediately print test samples requested by an operator or service person, regardless of the current print job that may be in progress. No interruption to the host communication path is incurred, and pending work or work stored in memory is maintained. The printer control system of the preferred embodiment is highly resource efficient with respect to cost and speed, and does not use an addition Raster Image process or large amounts of additional memory.

Figure 1:
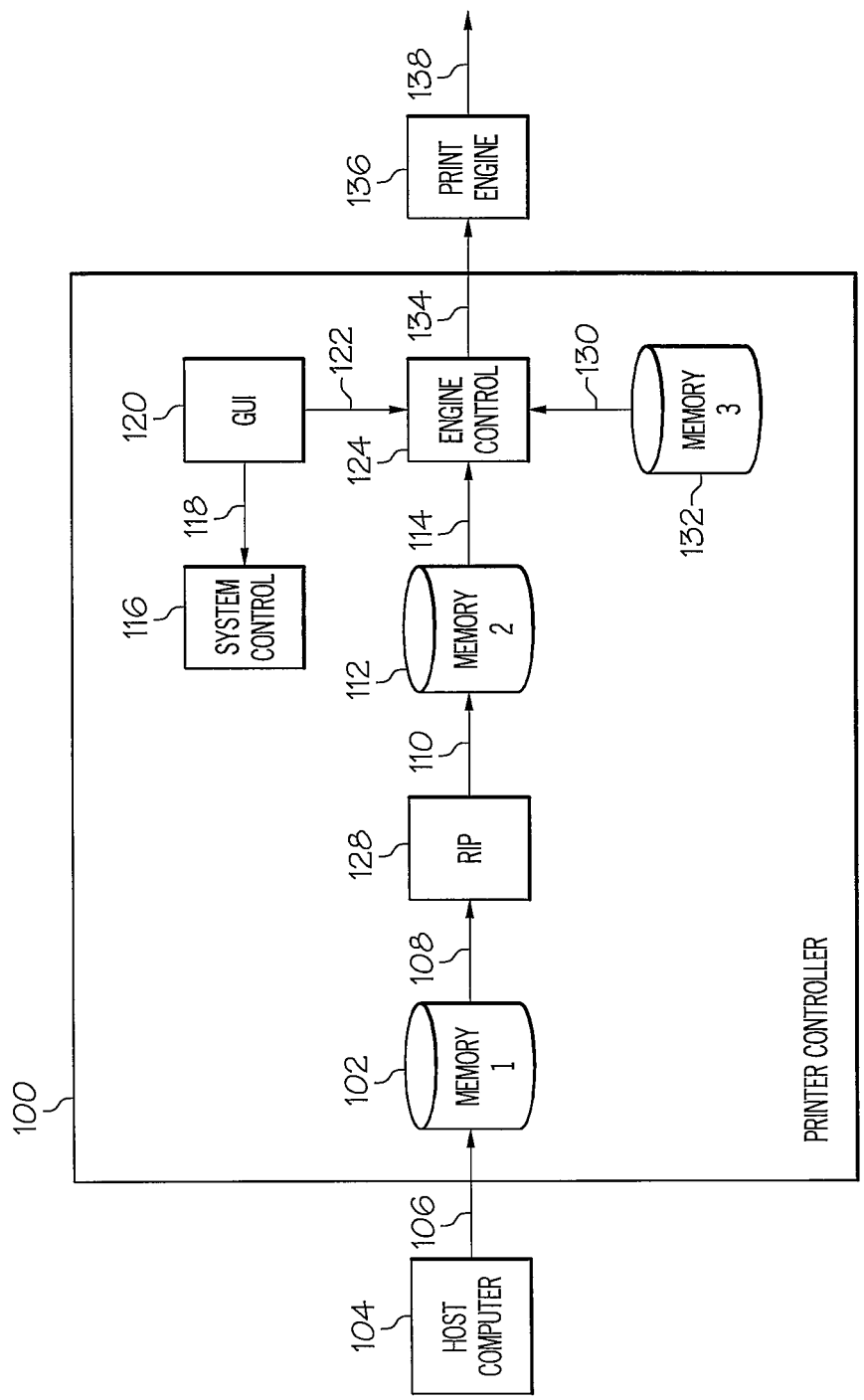
FIG. 1 depicts a block diagram of a printer controller with which the present invention of a system, method and computer program product for performing on-the-fly diagnostic printing may be performed.

With reference now to the figures, and in particular with reference to FIG. 1, a block diagram of a printer controller, in accordance with a preferred embodiment of the present invention, is depicted. The diagram is a high-level view of a printer controller 100. The basic function of a printer controller 100 is to receive print data commands in a print data stream 106 from a host computer, convert the print data commands into machine printable format, and then cause (by commands and data transfer) a print engine 136 mechanism to output the desired representation on a physical media (such as paper). A host computer 104 sends a print data stream 106 to a print controller 100 over some physical transport medium. Print data stream 104 is created and sent from host programs on a host computer 104 connected to the printer controller through some data transmission interface. The physical transport medium (not shown) may be the Parallel Printer port/cable, a USB cable, a Bluetooth wireless link, Ethernet, ESCON, FICON, or any other data transport mechanism.

Printer controller 100 contains a first memory 102, a second memory 112, a third memory 132, and an engine controller (labeled engine control 124). Additionally, a system controller (labeled system control 116) and engine control 124 receive commands 118 and 122 from GUI 120. GUI 120 is an interface, which is embodied as a graphical user interface, though non-graphical embodiments also fall within the scope of the present invention, that provides an operator control over printer controller 100. GUI 120 includes controls to start or stop the printing process, print test samples, and to advance continuous form paper. System control 116 is the main system control for printer controller 100. Whether acting based on input from GUI 120 or acting autonomously, system control 116 may perform system functions such as stopping print engine 136, connecting or disconnecting printer controller 100 from host computer 104, or purging all internal memory work areas within first memory 102, second memory 112, and third memory 132.

Engine control 124 of print controller 100 sends an instruction stream 134 to print engine 136, from which print engine 136 creates printed output 138. Engine Control 124 is responsible for operating the mechanism of print engine 136. Engine Control 124 sends commands and transfers bitmap data of buffered BMP stream 114 to print engine 136 in instruction stream 134. Print engine 136 physically attaches the bitmap dot pattern of instruction stream 134 to output print media (e.g., toner on paper, ink on paper, etc.) to create printed output 138.

Buffered output 108 from first memory 102 is then delivered to a Raster Image Processor (labeled RIP 128). RIP 128 processes buffered output 108 on the basis of the format of the data. Print data formats may consist of high-level printer languages such as Adobe's PostScript, IBM's Intelligent Printer Data Stream (IPDS), or many others. RIP 128 converts buffered output 108 into machine printable raster (e.g., dot patterns) bitmaps (BMPs) 110. RIP 128 contains intelligence for sizing the printable data within BMP 110 to match the output medium (paper size) so that the BMP 110 fits on the final output medium.

RIP 128 sends a BMP 110 to second memory buffer within second memory 112, for storage until engine control 124 is ready to accommodate additional data. Second memory 112 sends a buffered BMP stream 114 to engine control 124. Third memory 132 sends operator test samples 130 as BMPs to engine control 124. Engine control 124 provides the interface mechanism that interconnects the printer controller 100 to print engine 136 through the internal interface connection of print engine 136. Engine control 124 is generally responsible for commanding and sending (in order) bitmap data to print engine 136. Each of first memory 102, second memory 112, and third memory 132 can be embodied as RAM or permanent storage media such as hard drive, floppy disk or a USB memory key. First memory 102 is used to buffer and hold print data stream 106 from host computer 104. Second memory 112 is used to buffer hold rasterized data as BMPs 110 to be printed in an ordered manner. Third memory 132 is used to hold selected rasterized (bitmap) data for operator test samples 130.

For continuous form printers, the present invention provides operator controls available on the operator interface of GUI 120, including "Non-Process Run Out" (NPRO). This operator control is used by operators to move forms (blank paper) through the print engine device. Continuous form print engine 136 devices typically need to be "threaded" with paper by an operator, much like movie projectors must be threaded with a reel of film. The NPRO control is provided for operators of these devices to cause paper to be fed through the device. Typically, other devices are connected to these printers (to re-roll the printed output, or fold the printed output, or cut the printed output). These external devices must also be threaded with paper, so that the NPRO function is also needed to push additional blank paper to the output devices.

In a preferred embodiment of the present invention, engine control 124 and GUI 120 implement an enhanced Non-Process Run Out (NPRO) function to allow the NPRO to be implanted with test operator test samples 130. The reconfiguration of NPRO in engine control 124 creates a new 'printed paper advance' where only a blank paper advance existed previously. Operator test samples 130 are created from "pre-RIP'd" or "canned" bitmaps and stored by engine control 124 on third memory 132. Because the present invention avoids use of RIP 128, there is no effect on any current job in process and the work in process is not lost. Very little additional system resource consumption is required under the present invention.

Internally, the present invention allows system control 116 to treat printing of operator test samples 130 as if a conventional NPRO (blank paper advance) is occurring, and no counts or charges are made against the current print job in progress. From the perspective of an operator, nothing was changed. The operator simply stops print engine 136, even in the middle of a print job, and selects operator test samples 130 to be printed. When finished, the operator can restart print engine 136 and resume printing at the point of interruption, just as if a conventional routine NPRO (blank paper advance) had been performed.

Figure 2:
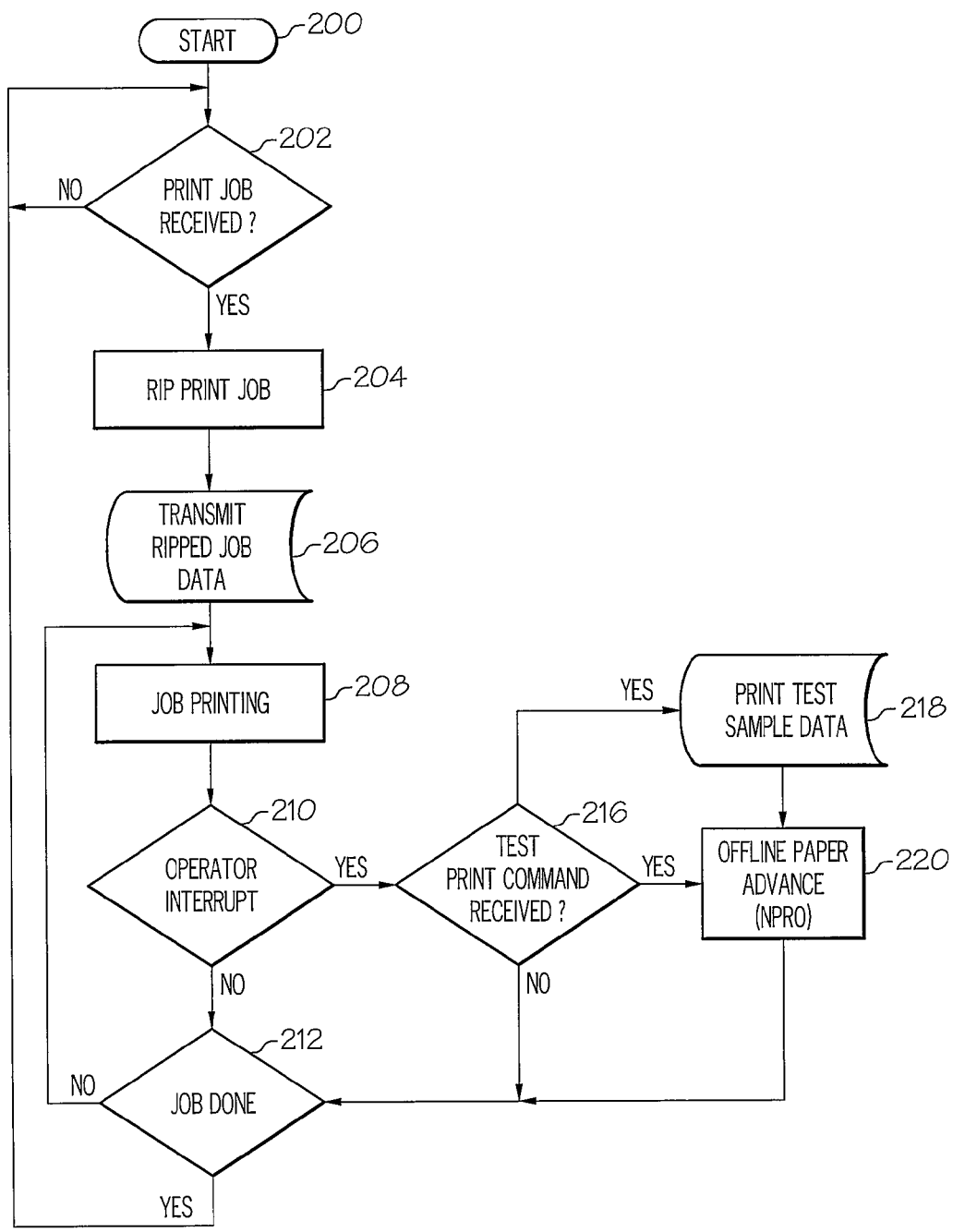
FIG. 2 is a high-level logical flowchart of a process for performing on-the-fly diagnostic printing.

Turning now to FIG. 2, a high-level logical flowchart of a process for performing on-the-fly diagnostic printing is depicted. The process starts at step 200 and then proceeds to step 202, which illustrates print controller 100 determining whether a print data stream 106 has been received into first memory 102 from host computer 104. If print controller 100 determines that a print data stream 106 has not been received into first memory 102 from host computer 104, then the process returns to step 202. If print controller 100 determines that a print data stream 106 has been received into first memory 102 from host computer 104, then the process proceeds to step 204. Step 204 illustrates print controller 100 transferring buffered output 108 to RIP 128, which converts buffered output 108 into machine printable bitmaps (BMPs) 110, which are stored in second memory 112. The process next moves to step 206, which illustrates print controller 100 transmitting buffered BMP stream 114 to engine control 124. The process then proceeds to step 208. Step 208 depicts print controller 100 printing the job received as print data stream 106 by sending commands and bitmap data of buffered BMP stream 114 from engine control 124 to print engine 136 in instruction stream 134.

The process next moves to step 210, which illustrates print controller 100 determining whether GUI 120 has received an instruction representing an operator interrupt. If printer controller 100 determines that GUI 120 has not received an instruction representing an operator interrupt, then the process proceeds to step 212. Step 212 illustrates printer controller 100 determining whether print engine 136 has concluded printing. If printer controller 100 determines that print engine 136 has concluded printing, then the process returns to step 202, which is described above. If printer controller 100 determining that print engine 136 has not concluded printing, then the process returns to step 208, which is described above.

Returning to step 210, if printer controller 100 determines that GUI 120 has received an instruction representing an operator interrupt, then the process proceeds to step 216, which illustrates printer controller 100 determining whether a command for a test print operation has been received from GUI 120. If printer controller 100 determines that a command for a test print operation has not been received from GUI 120, then the process returns to step 212, which is described above. If printer controller 100 determines that a command for a test print operation has been received from GUI 120, then the process next moves to step 218. Step 218 illustrates printer controller 100 performing a print of operator test samples 130 by sending operator test samples 130 to engine control 124 from third memory 132. In a preferred embodiment, the process simultaneously proceeds to step 220, which illustrates printer controller 100 invoking an NPRO function to hold the status of any other print jobs in the pipeline of printer controller 100. One skilled in the relevant art will quickly realize that, in alternative embodiments, step 220 and step 218 will be performed sequentially, without departing from the scope of the present invention. The process then returns to step 212, which is described above.

The methodology described provided benefits in speed of testing, provides the required ease of use (immediate test sample printing) for the operator, and maintains host communication while leaving the internal RIP/work areas unaffected.

While the invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of recordable type media.

What is claimed is:

1. A method comprising:
   in response to the receipt of a print interrupt during printing of a print data stream by a print engine,
   suspending said printing of said print data stream, and determining whether or not a test print command has been received during said printing suspension; and
   in response to a determination that said test print command has been received during said printing suspension,
   sending a rasterized bitmap of a test sample to said print engine without using a rasterized image processor, and
   printing said test sample by invoking a non-process runout (NPRO) function.

2. The method of claim 1, wherein said method further includes resuming said printing of said print data stream after said printing of said test sample.

3. The method of claim 1, wherein said printing said test sample further includes performing said printing said test sample via an execution of said NPRO function.

4. The method of claim 1, wherein said print interrupt is initiated by a user.

5. The method of claim 4, wherein said test print command is initiated by a user.

6. The method of claim 1, wherein said NPRO function includes an offline paper advance function.

7. A print system comprising:
   a print engine for printing a print data stream, wherein said print engine, in response to the receipt of a print interrupt during printing of a print data stream,
   suspends said printing of said print data stream, and
   determines whether or not a test print command has been received during said printing suspension;
   a print controller, in response to a determination that said test print command has been received during said printing suspension,
   sends a rasterized bitmap of a test sample to said print engine without using a rasterized image processor, and
   enables said print engine to print said test sample by invoking a non-process runout (NPRO) function.

8. The print system of claim 7, wherein said print engine resumes said printing of said print data stream after the completion of printing said test sample.

9. The print system of claim 7, wherein said print interrupt is initiated by a user.

10. The print system of claim 9, wherein said test print command is initiated by a user.

11. The print system of claim 7, wherein said print said test sample is performed via an execution of said NPRO function.

12. The print system of claim 7, wherein said NPRO function includes an offline paper advance function.

\* \* \* \* \*